US007657724B1

(12) United States Patent  (10) Patent No.: US 7,657,724 B1
DeHaemer  (45) Date of Patent: Feb. 2, 2010

(54) ADDRESSING DEVICE RESOURCES IN VARIABLE PAGE SIZE ENVIRONMENTS

(75) Inventor: Eric DeHaemer, Shrewsbury, MA (US)

(73) Assignee: Intel Corporation, Santa Clara, CA (US)

( * ) Notice: Subject to any disclaimer, the term of this patent is extended or adjusted under 35 U.S.C. 154(b) by 309 days.

(21) Appl. No.: 11/638,222

(22) Filed: Dec. 13, 2006

(51) Int. Cl.
*G06F 12/00* (2006.01)
(52) U.S. Cl. .............................. 711/202; 711/217; 710/3
(58) Field of Classification Search .................. 711/202, 711/217; 710/3
See application file for complete search history.

(56) References Cited

U.S. PATENT DOCUMENTS

| | | | |
|---|---|---|---|
| 6,009,488 A | | 12/1999 | Kavipurapu |
| 6,012,132 A | * | 1/2000 | Yamada et al. ............... 711/207 |
| 6,526,459 B1 | * | 2/2003 | Campbell et al. ............. 710/51 |
| 6,725,289 B1 | * | 4/2004 | Waldspurger et al. .......... 710/9 |
| 7,370,174 B2 | * | 5/2008 | Arizpe et al. ................ 711/206 |
| 7,409,485 B1 | * | 8/2008 | Sartin .......................... 710/305 |
| 2007/0136554 A1 | * | 6/2007 | Biran et al. .................. 711/203 |

OTHER PUBLICATIONS

"PCI Express Enhances Performance in Ethernet Networks", *Technology@Intel Magazine*, (Nov. 2005), 9 pgs.
"PCI Express Ethernet Networking", *Intel PRO Network Adapters*, (Sep. 2005), 6 pgs.
Abramson, Darren , et al., "Intel Virtualization Technology for Directed I/O", *Intel Technology Journal*, vol. 10, Issue 03, ISSN 1535-864X, DOI: 10.535/itj.1003, (Aug. 10, 2006), 16 pgs.

* cited by examiner

*Primary Examiner*—Christian P Chace
*Assistant Examiner*—Hashem Farrokh
(74) *Attorney, Agent, or Firm*—Caven & Aghevli LLC

(57) ABSTRACT

Methods and apparatus to improve addressing of device resources in variable page size environments are described. In one embodiment, an address conversion logic (which may be provided within a chipset in an embodiment) may convert a first address into a second address based on a difference between a first memory page size and the second memory page size. Other embodiments are also disclosed.

18 Claims, 5 Drawing Sheets

ADDRESSING DEVICE RESOURCES IN VARIABLE PAGE SIZE ENVIRONMENTS

BACKGROUND

The present disclosure generally relates to the field of electronics. More particularly, an embodiment of the invention relates to techniques for addressing device resources in variable page size environments.

Input/output (I/O) virtualization is a technology being developed to ensure that I/O devices function properly in a virtualized environment. For example, when an I/O device issues a direct memory access (DMA) request in a virtualized environment (e.g., where there may be more than one operating system (OS) active in the system), a translation may be performed on the address specified by the DMA request to ensure that the DMA operation and resulting effects are committed to the portion of the memory space that corresponds to the given I/O device.

Moreover, to limit data corruption, memory space utilized by different agents such as software applications or operating systems may be divided into predefined portions (also referred to as "pages") and each of the agents may only be allowed to access data within the boundaries defined for corresponding pages. However, the page size used by a system memory shared amongst various agents (such as I/O devices, software applications, or operating systems I/O devices) may be reconfigured over time, e.g., to improve performance or allow access to additional memory space. When the page size of the system memory is modified, an I/O device may end up having a different page size than the system memory. As a result, changes in the system memory page size may render some I/O devices inoperable or cause complications.

BRIEF DESCRIPTION OF THE DRAWINGS

The detailed description is provided with reference to the accompanying figures. In the figures, the left-most digit(s) of a reference number identifies the figure in which the reference number first appears. The use of the same reference numbers in different figures indicates similar or identical items.

DETAILED DESCRIPTION

In the following description, numerous specific details are set forth in order to provide a thorough understanding of various embodiments. However, some embodiments may be practiced without the specific details. In other instances, well-known methods, procedures, components, and circuits have not been described in detail so as not to obscure the particular embodiments. Various aspects of embodiments of the invention may be performed using various means, such as integrated semiconductor circuits ("hardware"), computer-readable instructions organized into one or more programs ("software") or some combination of hardware and software. For the purposes of this disclosure reference to "logic" shall mean either hardware, software, or some combination thereof.

Some of the embodiments discussed herein may allow a device (such as an I/O device) to maintain a constant internal memory map regardless of variations in memory page sizes utilized by devices coupled to a bus that conforms to the peripheral component interconnect express (PCIe) (e.g., which may operate in accordance with PCIe Specification, Revision 2.0, October 2006). In an embodiment, upon a detection that the memory page sizes of the I/O device and the other devices coupled to the PCIe bus differ, the incoming address may be compressed or converted to conform with the memory map of the I/O device. Furthermore, some of the techniques discussed herein may be utilized in various types of computing environments, such as those discussed with reference to FIGS. 1-5.

Figure 1:
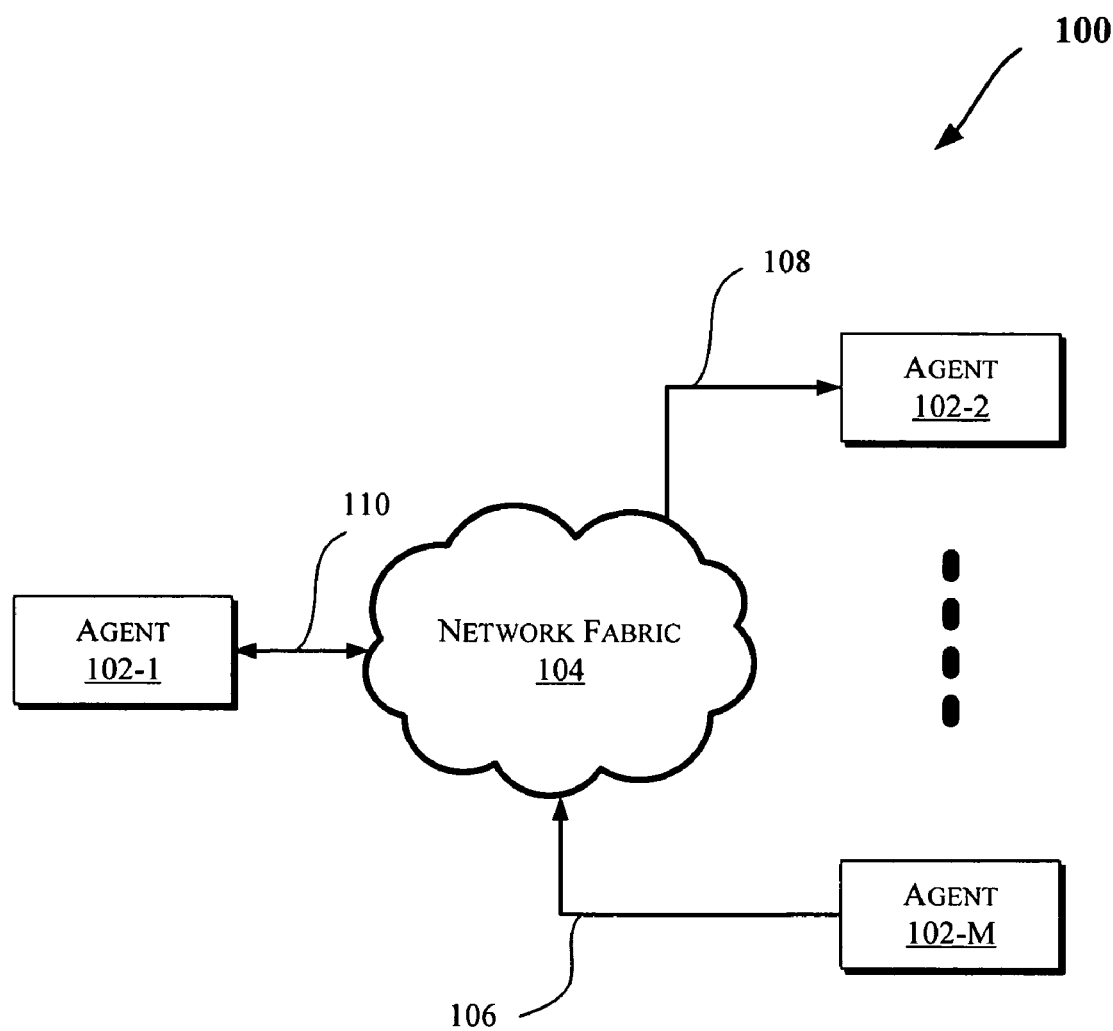
FIGS. 1-3 and 5 illustrate block diagrams of embodiments of computing systems, which may be utilized to implement various embodiments discussed herein.

More particularly, FIG. 1 illustrates a block diagram of a computing system 100, according to an embodiment of the invention. The system 100 may include one or more agents 102-1 through 102-M (collectively referred to herein as "agents 102" or more generally "agent 102"). In an embodiment, the agents 102 may be components of a computing system, such as the computing systems discussed with reference to FIGS. 2-5.

As illustrated in FIG. 1, the agents 102 may communicate via a network fabric 104. In one embodiment, the network fabric 104 may include a computer network that allows various agents (such as computing devices) to communicate data. In an embodiment, the network fabric 104 may include one or more interconnects (or interconnection networks) that communicate via a serial (e.g., point-to-point) link and/or a shared communication network. For example, some embodiments may facilitate component debug or validation on links that allow communication with fully buffered dual in-line memory modules (FBD), e.g., where the FBD link is a serial link for coupling memory modules to a host controller device (such as a processor or memory hub). Debug information may be transmitted from the FBD channel host such that the debug information may be observed along the channel by channel traffic trace capture tools (such as one or more logic analyzers).

In one embodiment, the system 100 may support a layered protocol scheme, which may include a physical layer, a link layer, a routing layer, a transport layer, and/or a protocol layer. The fabric 104 may further facilitate transmission of data (e.g., in form of packets) from one protocol (e.g., caching processor or caching aware memory controller) to another protocol for a point-to-point or shared network. Also, in some embodiments, the network fabric 104 may provide communication that adheres to one or more cache coherent protocols.

Furthermore, as shown by the direction of arrows in FIG. 1, the agents 102 may transmit and/or receive data via the network fabric 104. Hence, some agents may utilize a unidirectional link while others may utilize a bidirectional link for communication. For instance, one or more agents (such as agent 102-M) may transmit data (e.g., via a unidirectional link 106), other agent(s) (such as agent 102-2) may receive data (e.g., via a unidirectional link 108), while some agent(s) (such as agent 102-1) may both transmit and receive data (e.g., via a bidirectional link 110).

Figure 2:
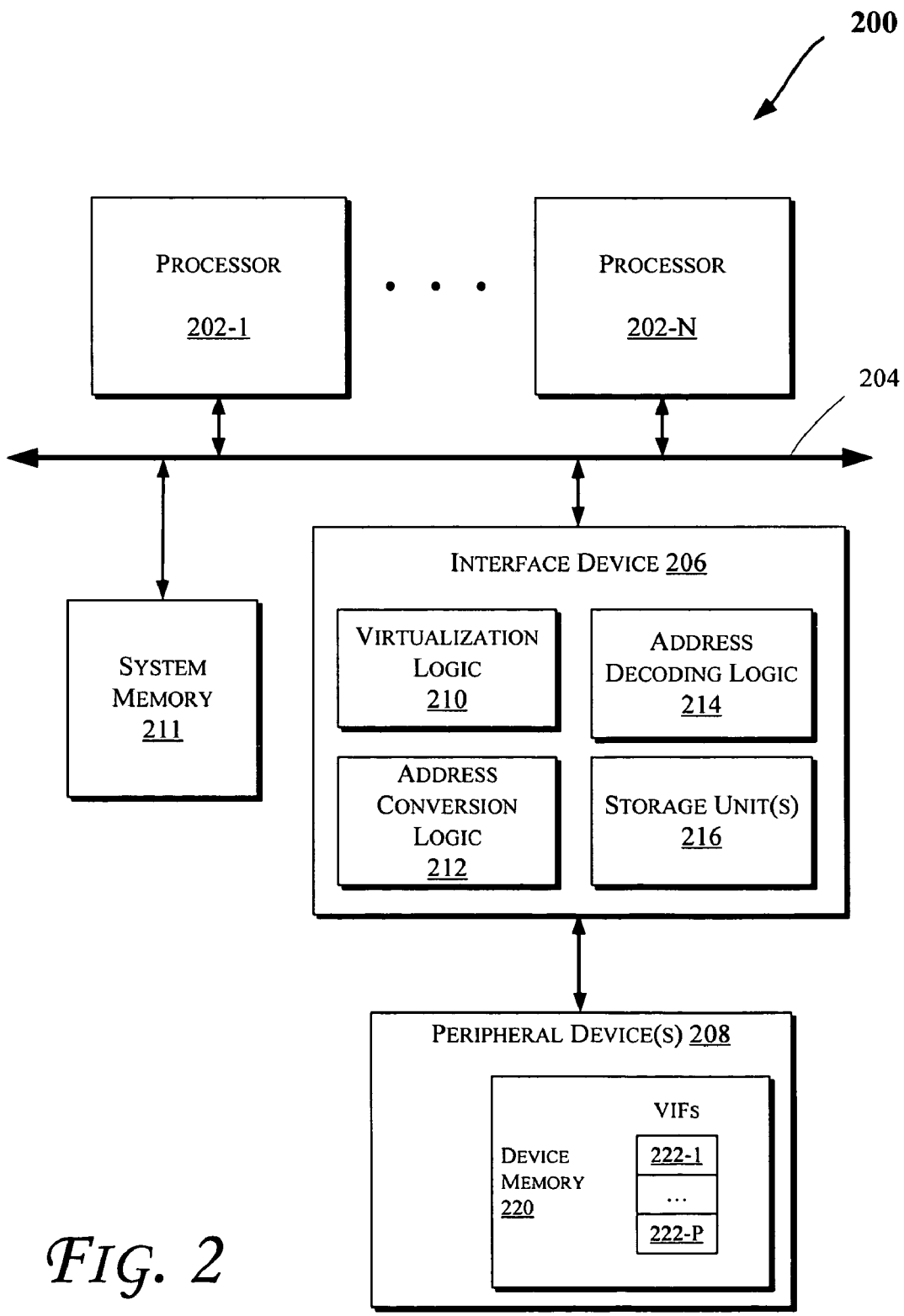

FIG. 2 illustrates a block diagram of portions of a computing system 200, according to an embodiment. In one embodiment, various components of the system 200 may be implemented by one of the agents 102-1 and/or 102-M discussed with reference to FIG. 1. Further details regarding some of the operation of the computing system 200 will be discussed herein with reference to FIG. 4.

The system 200 may include one or more processors 202-1 through 202-N (collectively referred to herein as "processors 202" or more generally "processor 202"). Each of the processors 202-1 through 202-N may include various components, such as private or shared cache(s), execution unit(s), one or more cores, etc. Moreover, the processors 202 may communicate through a bus 204 with other components such as an interface device 206. In an embodiment, the interface device 206 may be a chipset or a memory controller hub (MCH). Moreover, as will be further discussed with reference to FIG. 5, the processors 202 may communicate via a point-to-point (PtP) connection with other components. Additionally, the interface device 206 may communicate with one or more peripheral devices 208 (collectively referred to herein as "peripheral devices 208" or more generally "device 208"). The devices 208 may be a peripheral device that communicates in accordance with the PCIe specification in an embodiment. Moreover, the devices 208 may be I/O devices, storage devices, etc.

As shown in FIG. 2, the interface device 206 may include a virtualization logic 210. The logic 210 may perform address translation operations for virtualized environments, such as translating virtual addresses into physical addresses. The physical addresses may correspond to locations (e.g., entries) with a system memory 211. The logic 210 may additionally perform other operations such as those discussed with reference to FIGS. 3 and 4.

Furthermore, an address conversion logic 212 may be coupled between a variety of agents (e.g., peripheral devices 208 and other devices in communication with the interface device 206, for example, via the bus 204). As will be further discussed with reference to FIG. 4, the logic 212 may convert a first address (corresponding to an access request directed at one of the devices 208) into a second address based on the difference between the memory page size utilized by the corresponding device 208 and the memory page size utilized by the transmitting agent. The interface device 206 may further include an address decoding logic 214 to decode addresses that are directed at the devices 208, as will be further discussed with reference to FIG. 4. The interface device 206 may further include one or more storage units (such as one or more hardware registers) to store various types of data.

As shown in FIG. 2, the peripheral devices may include a device memory 220. In one embodiment, the device memory 220 may store one or more entries (e.g., 222-1 through 222-P, collectively referred to herein as "entries 222") that correspond to virtual interfaces (VIFs). Hence, devices 208 may support one or more VIFs that may be linearly mapped into the device memory 220 at entries 222. VIFs may be mapped sequentially into a memory region identified by a single base address register (BAR). The entries 222 may have corresponding entries in other memory devices (e.g., the system memory 211) to enable memory mapped I/O (MMIO) operations. Further, the devices 208 may include address translation mechanisms (not shown), so that an address may be mapped into an internal address of the devices 208 in an embodiment. In one embodiment, each VIF may consume a fixed amount of MMIO resources that are separated on memory page size boundaries that enable the VIF to be placed on separate memory pages. In an embodiment, the storage unit(s) 216 may store data corresponding to one or more memory page sizes of various components of the system 200, e.g., including for example the memory page sizes corresponding to portions of the system memory 211 and/or the device memory 220. Even though in FIG. 2, the logics 212-16 are shown to be present in the interface device 206, these logics may be located elsewhere, such as within the peripheral devices 208 and/or other components of the system 200.

Figure 3:
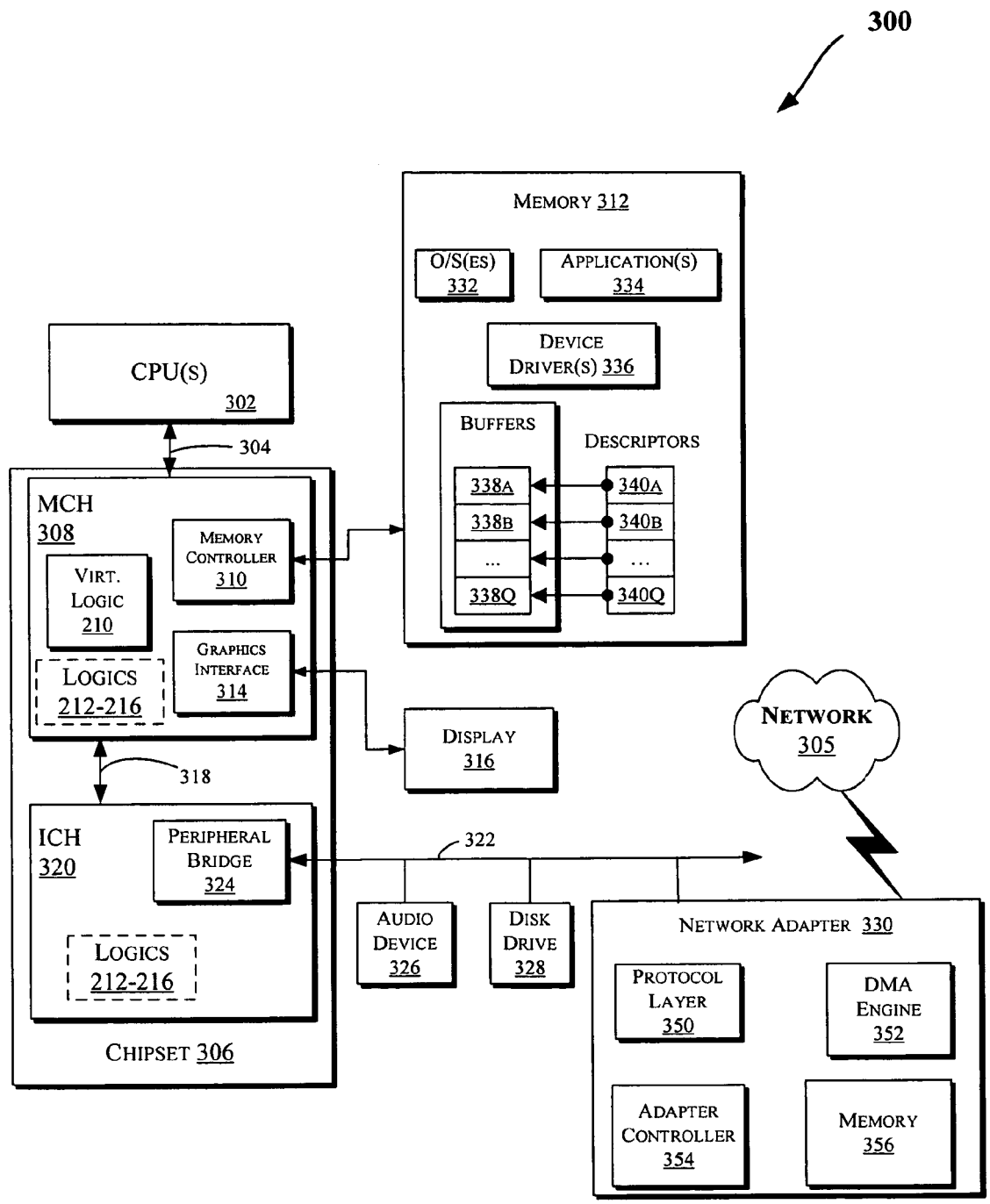

FIG. 3 illustrates a block diagram of an embodiment of a computing system 300. One or more of the components of FIG. 1 and/or of FIG. 2 may comprise one or more components discussed with reference to the computing system 300. The computing system 300 may include one or more central processing unit(s) (CPUs) 302 (which may be collectively referred to herein as "processors 302" or more generically "processor 302") coupled to an interconnection network (or bus) 304. The processors 302 may be any type of processor such as a general purpose processor, a network processor (which may process data communicated over a computer network 305), etc. (including a reduced instruction set computer (RISC) processor or a complex instruction set computer (CISC)). Moreover, the processors 302 may have a single or multiple core design. The processors 302 with a multiple core design may integrate different types of processor cores on the same integrated circuit (IC) die. Also, the processors 302 with a multiple core design may be implemented as symmetrical or asymmetrical multiprocessors.

The processor 302 may include one or more caches (not shown), which may be private and/or shared in various embodiments. Generally, a cache stores data corresponding to original data stored elsewhere or computed earlier. To reduce memory access latency, once data is stored in a cache, future use may be made by accessing a cached copy rather than refetching or recomputing the original data. The cache(s) may be any type of cache, such a level 1 (L1) cache, a level 3 (L2) cache, a level 3 (L-3), a mid-level cache, a last level cache (LLC), etc. to store electronic data (e.g., including instructions) that is utilized by one or more components of the system 300.

A chipset 306 may additionally be coupled to the interconnection network 304. In an embodiment, the chipset 306 may be the same as or similar to the interface device 206 of FIG. 2. Further, the chipset 306 may include a memory control hub (MCH) 308. The MCH 308 may include a memory controller 310 that is coupled to a memory 312. The memory 312 may store data, e.g., including sequences of instructions that are executed by the processor 302, or any other device in communication with components of the computing system 300. In an embodiment, the memory 312 may be the same or similar to the memory 211 of FIG. 2. Also, in one embodiment of the invention, the memory 312 may include one or more volatile storage (or memory) devices such as random access memory (RAM), dynamic RAM (DRAM), synchronous DRAM (SDRAM), static RAM (SRAM), etc. Nonvolatile memory may also be utilized such as a hard disk. Additional devices may be coupled to the interconnection network 304, such as multiple processors and/or multiple system memories.

The MCH 308 may further include a graphics interface 314 coupled to a display device 316 (e.g., via a graphics accelerator in an embodiment). In one embodiment, the graphics interface 314 may be coupled to the display device 316 via an accelerated graphics port (AGP). In an embodiment of the invention, the display device 316 (such as a flat panel display) may be coupled to the graphics interface 314 through, for example, a signal converter that translates a digital representation of an image stored in a storage device such as video memory or system memory (e.g., memory 312) into display signals that are interpreted and displayed by the display 316.

As shown in FIG. 3, a hub interface 318 may couple the MCH 308 to an input/output control hub (ICH) 320. The ICH 320 may provide an interface to input/output (I/O) devices coupled to the computing system 300. The ICH 320 may be coupled to a bus 322 through a peripheral bridge (or controller) 324, such as a peripheral component interconnect (PCI) bridge that may be compliant with the PCIe specification, a universal serial bus (USB) controller, etc. The bridge 324 may provide a data path between the processor 302 and peripheral devices. Other types of topologies may be utilized. Also, multiple buses may be coupled to the ICH 320, e.g., through multiple bridges or controllers. For example, the bus 322 may comply with the PCI Local Bus Specification, Revision 3.0, Mar. 9, 3004, available from the PCI Special Interest Group, Portland, Oreg., U.S.A. (hereinafter referred to as a "PCI bus"). Alternatively, the bus 322 may comprise a bus that complies with the PCI-X Specification Rev. 3.0a, Apr. 33, 3003, (hereinafter referred to as a "PCI-X bus") and/or PCIe specification, available from the aforesaid PCI Special Interest Group, Portland, Oreg., U.S.A. Further, the bus 322 may comprise other types and configurations of bus systems. Moreover, other peripherals coupled to the ICH 320 may include, in various embodiments of the invention, integrated drive electronics (IDE) or small computer system interface (SCSI) hard drive(s), USB port(s), a keyboard, a mouse, parallel port(s), serial port(s), floppy disk drive(s), digital output support (e.g., digital video interface (DVI)), etc.

The bus 322 may be coupled to an audio device 326, one or more disk drive(s) 328, and a network adapter 330 (which may be a NIC in an embodiment). In one embodiment, the network adapter 330 or other devices coupled to the bus 322 may communicate with the chipset 306 via the switching logic 212. Other devices may be coupled to the bus 322. Also, various components (such as the network adapter 330) may be coupled to the MCH 308 in some embodiments of the invention. In addition, the processor 302 and the MCH 308 may be combined to form a single chip.

Additionally, the computing system 300 may include volatile and/or nonvolatile memory (or storage). For example, nonvolatile memory may include one or more of the following: read-only memory (ROM), programmable ROM (PROM), erasable PROM (EPROM), electrically EPROM (EEPROM), a disk drive (e.g., 328), a floppy disk, a compact disk ROM (CD-ROM), a digital versatile disk (DVD), flash memory, a magneto-optical disk, or other types of nonvolatile machine-readable media capable of storing electronic data (e.g., including instructions).

The memory 312 may include one or more of the following in an embodiment: an operating system (O/S) 332, application 334, device driver 336, buffers 338, and/or descriptors 340. For example, a virtual machine (VM) configuration (e.g., implemented through on a virtual machine monitor (VMM) module) may allow the system 300 to operate as multiple computing systems, e.g., each running a separate set of operating systems (332), applications (334), device driver(s) (336), etc. Programs and/or data stored in the memory 312 may be swapped into the disk drive 328 as part of memory management operations. The application(s) 334 may execute (e.g., on the processor(s) 302) to communicate one or more packets with one or more computing devices coupled to the network 305. In an embodiment, a packet may be a sequence of one or more symbols and/or values that may be encoded by one or more electrical signals transmitted from at least one sender to at least on receiver (e.g., over a network such as the network 305). For example, each packet may have a header that includes various information which may be utilized in routing and/or processing the packet, such as a source address, a destination address, packet type, etc. Each packet may also have a payload that includes the raw data (or content) the packet is transferring between various computing devices over a computer network (such as the network 305).

In an embodiment, the application 334 may utilize the O/S 332 to communicate with various components of the system 300, e.g., through the device driver 336. Hence, the device driver 336 may include network adapter (330) specific commands to provide a communication interface between the O/S 332 and the network adapter 330, or other I/O devices coupled to the system 300, e.g., via the chipset 306. In an embodiment, the device driver 336 may allocate one or more buffers (338A through 338Q) to store I/O data, such as the packet payload. One or more descriptors (340A through 340Q) may respectively point to the buffers 338. In an embodiment, one or more of the buffers 338 may be implemented as circular ring buffers. Also, one or more of the buffers 338 may correspond to contiguous memory pages in an embodiment.

In an embodiment, the O/S 332 may include a network protocol stack. A protocol stack generally refers to a set of procedures or programs that may be executed to process packets sent over a network (305), where the packets may conform to a specified protocol. For example, TCP/IP (Transport Control Protocol/internet Protocol) packets may be processed using a TCP/IP stack. The device driver 336 may indicate the buffers 338 that are to be processed, e.g., via the protocol stack.

As illustrated in FIG. 3, the network adapter 330 may include a (network) protocol layer 350 for implementing the physical communication layer to send and receive network packets to and from remote devices over the network 305. The network 305 may include any type of computer network. The network adapter 330 may further include a direct memory access (DMA) engine 352, which reads and/or writes packets from/to buffers (338) assigned to available descriptors (340) to transmit and/or receive data over the network 305. Additionally, the network adapter 330 may include a network adapter controller 354, which may include logic (such as one or more programmable processors) to perform adapter related operations. In an embodiment, the adapter controller 354 may be a MAC (media access control) component. The network adapter 330 may further include a memory 356, such as any type of volatile/nonvolatile memory (e.g., including one or more cache(s) and/or other memory types discussed with reference to memory 312). In an embodiment, the memory 356 may be the same or similar to the device memory 220 of FIG. 2. Further, in some embodiments, the network adapter 330 may provide access to a remote storage device, e.g., via the network 305.

Additionally, in one embodiment, the chipset 306 (e.g., within the MCH 308 in an embodiment) may include an I/O translation look-aside buffer (TLB) (not shown) that stores address translation information corresponding to one or more memory access requests (e.g., including read or write accesses to the memory 312). The I/O TLB may be a content addressable memory (CAM) or other types of cache (or memory discussed with reference to memory 312). The I/O TLB may be accessible by the virtualization logic 210 to facilitate translation of virtual addresses into physical addresses.

In one embodiment, a memory access request (e.g., such as a DMA request generated by the DMA engine 352 or other devices coupled to the system 300, for example, via the chipset 306) may be sent to the virtualization logic 210. The logic 210 may determine whether the corresponding I/O TLB includes an entry that corresponds to the received request. Moreover, the logic 210 may be provided in other locations than that shown in FIG. 3. For example, logic 210 may be provided elsewhere in the chipset 306, e.g., within ICH 320. Also, logic 210 may be located elsewhere outside the chipset 306, e.g., provided within the network adapter 330. Similarly, one or more of the logics 212-216 of FIG. 2 may be provided within various components of the system 300, such as the chipset 306, ICH 320, and/or MCH 308, for example.

Figure 4:
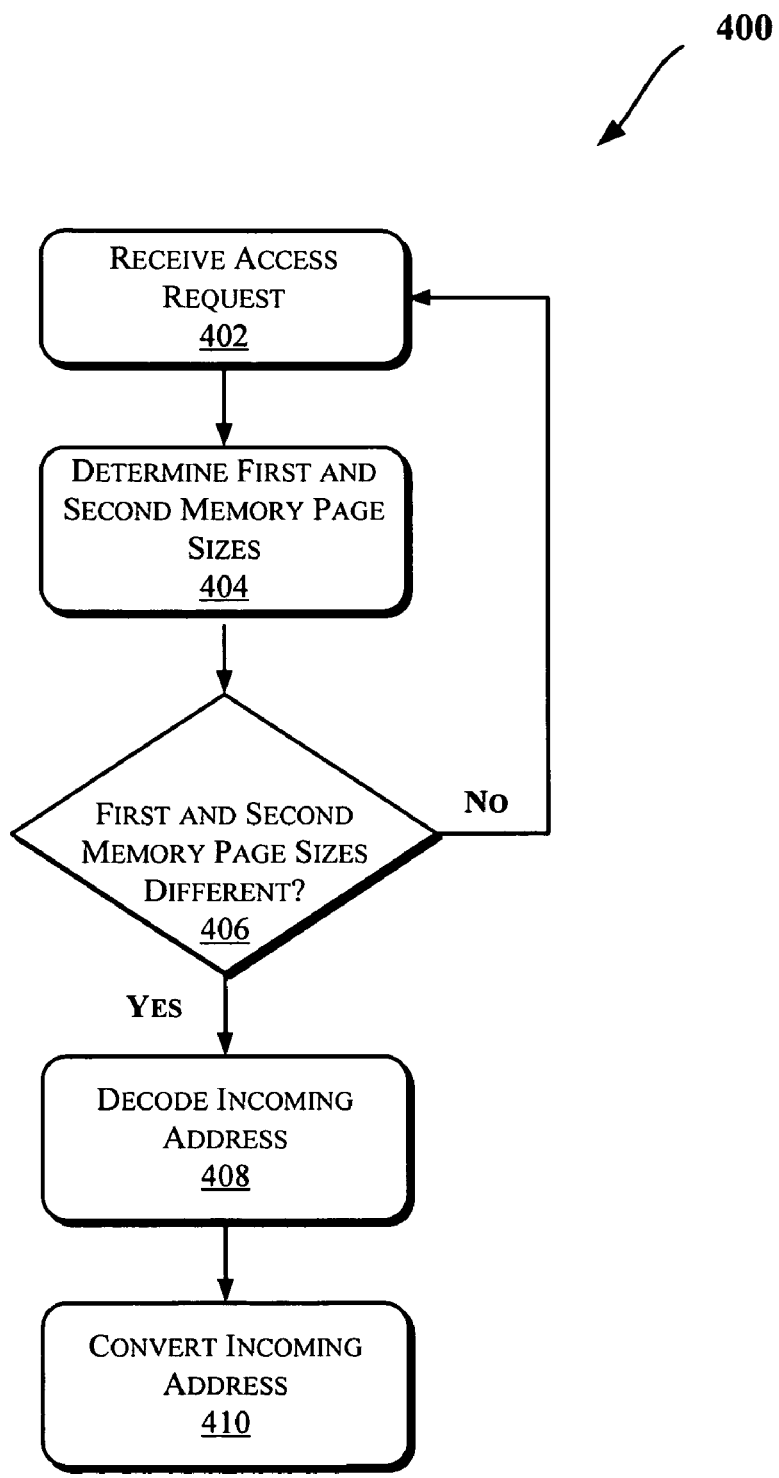
FIG. 4 illustrates a flow diagram of a method according to an embodiment.

FIG. 4 illustrates a flow diagram of a method 400 to convert a first address into a second address to improve addressing of device resources in variable page size environments, according to an embodiment. In one embodiment, various components discussed with reference to FIGS. 1-3 and 5 may be utilized to perform one or more of the operations discussed with reference to FIG. 4.

Referring to FIGS. 1-4, at an operation 402, an access request (such as a read or write access request) for resources of a device are provided. For example, the access request may be transmitted from one of the components of the system 200 of FIG. 2 to one of the devices 208. At an operation 404, a plurality of memory page sizes (also referred to as strides in some implementations) may be determined. For example operation 404 may be performed by accessing values stored in the storage unit(s) 216 which may store data corresponding to one or more memory page sizes of various components of the system 200, e.g., including for example the memory page sizes corresponding to portions of the system memory 211 and/or the device memory 220. Data stored in the storage unit(s) 216 may be provided via various mechanisms such as copying data from specific register(s) located in various locations of system 200, based on data included in a transmitted message, copying data from a static ROM, etc.

At an operation 406, if the first and second memory page sizes are not different, the method 400 continues with the operation 402 to receive the next access request. Alternatively, if the first and second memory page sizes differ, at an operation 408, the incoming address corresponding to the access request of operation 402 may be decoded. For example, the decoding logic 214 may decode the address corresponding to an access request directed to one of the devices 208 to determine a virtual interface number (e.g., corresponding to one of the entries 222) and a base register offset value (e.g., that may correspond to page size or stride of the device memory 220 which may be used in conjunction with a BAR value to access entries 222, for example).

At an operation 410, the incoming address may be converted. For example, the address conversion logic 212 may convert the incoming address into a second address that conforms with the memory page size corresponding to the device memory 220. In an embodiment, the logic 212 may determine the page size corresponding to the transmitting agent and the corresponding device 208 by accessing storage unit(s) 216, so that the VIFs of the corresponding peripheral device 208 may be caused to be spaced out and aligned to the new page size. Such embodiments may enable the use of processor's per page translation and protection mechanisms. For example, the page size of the system memory 211 may be increased from a 4 kByte stride to an 8 kByte stride, while the size of entries 222 may remain at 4 kBytes. In response, the method 400 may compress the incoming address such that the compressed address may be used to access the corresponding entries 222.

In an embodiment, to maintain the constant internal address mapping for devices 208, the upper PCI address bits of an incoming address may be extracted and right-shift a number of times based on the relative difference between the internal stride (e.g., corresponding to one of the devices 208) and an external stride (e.g., corresponding to a transmitting agent such as one of the components of system 200). In an embodiment, the incoming address may be converted as follows (where "/*" indicates start of comments):

I=log2 (internal stride); /* where I is the number of address bits
/* used by each VIF, e.g., I=12 for a 4 KB stride
P=log2 (external stride); /* where P is the number of address
/* bits used by a transmitting agent, e.g., system
/* memory 211 stride; for example, P=13 for 8 KB stride if P<=I, then external stride is less than or equal to the internal stride and no adjustment is necessary /* which may correspond to the "no" branch of
/* operation 406 of FIG. 4
else if Incoming_Address[P:I]< >0, then the incoming address exceeds the internal stride and addresses aliasing may occur /* may terminate with error
/* or continue if aliasing is okay
else
VIF_Number=Incoming_Address[63:P]
Register_Offset=Incoming_Address[I−1:0]
Converted_Address=VIF_Number && Register_Offset
/* concatenate VIF_Number and Register_Offset The corresponding device 208 may then use the Converted_Address and apply its address translation rules (if applicable). Alternatively, some devices 208 may apply the translation rules first and then perform the page adjustment discussed above. For example, a device (208) may support 4 VIFs that are allocated on 4 KB boundaries. The device would advertise through its BAR that is requires 4*4 KB or 16 KB of memory space. When an access request transaction is received, it may be compared against the BAR to determine if it should be claimed. Once claimed, the Incoming_Address [63:14] may be masked to produce a 16 kByte 0-aligned address. Hence, address bits [13:12] may identify the VIF and bits [11:0] may identify the location within the VIF. In some embodiments, this 0-aligned address may be translated up to some other address by applying a translation value to the upper address bits. If the System Page size is changed so that the external stride is now 8 kByte, the device may adjust the incoming address to compress the address space. Hence, in such as a case, the external stride is 8 kByte and P=13. The internal stride is 4 kByte and I=12. Incoming Address[63:13] is right shifted 1 place to compress the address space while preserving Address bits 11:0. The new compressed address is then passed through the translation mechanism to create the converted address.

In one embodiment, a second mechanism may be implemented where the lower address bits are masked off and the entire 64-bit address is shifted and then the lower address bits are logically OR-ed back to form the converted address. For example, for a 4 kByte internal stride, the Mask=0000_0000_0000_0FFFh. The following pseudo code may be utilized:

VIF_number=Incoming_Address[63:0] AND Not(Mask)
VIF_number=VIF_number>>(P−I)
Register_Offset=Incoming_Address[63:0] AND Mask
Converted_Address=VIF_number OR Register_Offset The Converted_Address may then be used in address translation. Some devices (208) such as storage I/O processors (IOPs) may have programmable translation mechanisms and variable PCIe BARs, or internal strides. In this environment, the device may have a programmable field that indicates the internal stride (I), the external stride (P), and the mask. This way the mask and internal stride may be programmed based on the application running on the IOP.

In an embodiment, a third mechanism may be used by devices that use some of the upper address bits to directly map to internal queues (e.g., queues or entries in the device memory 220 such as the entries 222). In this case, the queue address may be identified by the external stride and the number of VIFs as follows:

$P=\log 2(\text{external stride})$; /*P=13 for 8 kByte strides $N=\log 2(\text{number of VIFs})$; /*N=2 for 4 VIFs Queue_ID=Incoming_Address[P+(N−1):P]

For the example discussed previously, the Queue_ID=Incoming_Address[14:13].

Figure 5:
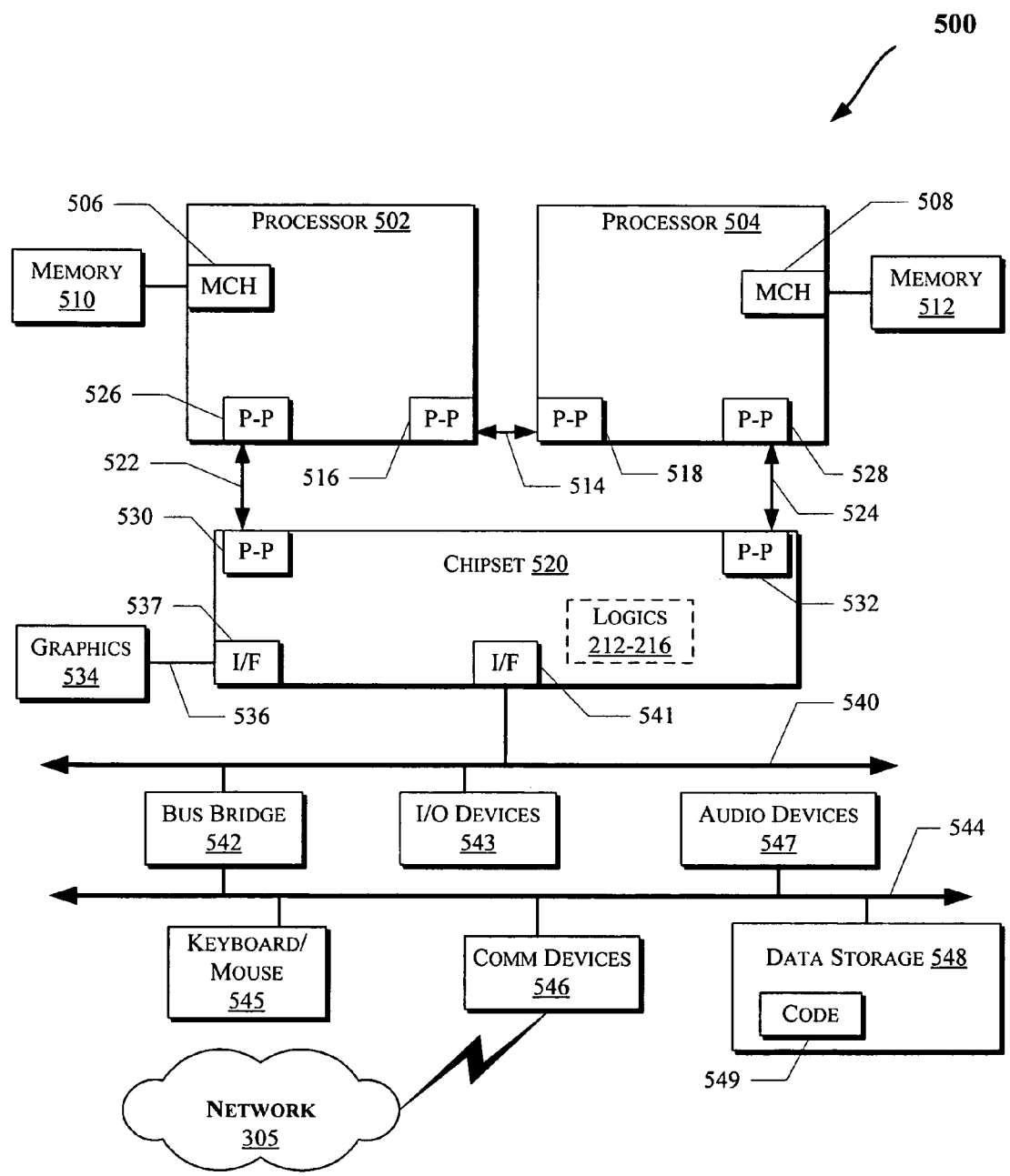

FIG. 5 illustrates a computing system 500 that is arranged in a point-to-point (PtP) configuration, according to an embodiment of the invention. In particular, FIG. 5 shows a system where processors, memory, and input/output devices are interconnected by a number of point-to-point interfaces. The operations discussed with reference to FIGS. 1-4 may be performed by one or more components of the system 500.

As illustrated in FIG. 5, the system 500 may include several processors, of which only two, processors 502 and 504 are shown for clarity. The processors 502 and 504 may each include a local memory controller hub (MCH) 506 and 508 to enable communication with memories 510 and 512. The memories 510 and/or 512 may store various data such as those discussed with reference to the memory 312 of FIG. 3. As shown in FIG. 5, the processors 502 and 504 may also include the cache(s) 513 discussed with reference to FIG. 5.

In an embodiment, the processors 502 and 504 may be one of the processors 302 discussed with reference to FIG. 3. The processors 502 and 504 may exchange data via a point-to-point (PtP) interface 514 using PtP interface circuits 516 and 518, respectively. Also, the processors 502 and 504 may each exchange data with a chipset 520 via individual PtP interfaces 522 and 524 using point-to-point interface circuits 526, 528, 530, and 532. The chipset 520 may further exchange data with a high-performance graphics circuit 534 via a high-performance graphics interface 536, e.g., using a PtP interface circuit 537.

In at least one embodiment, one or more of the logics 212-216 may be provided in the chipset 520 and/or other components of the system 500 such as those communicating via a bus 540. Other embodiments of the invention, however, may exist in other circuits, logic units, or devices within the system 500 of FIG. 5. Furthermore, other embodiments of the invention may be distributed throughout several circuits, logic units, or devices illustrated in FIG. 5.

The chipset 520 may communicate with the bus 540 using a PtP interface circuit 541. The bus 540 may have one or more devices that communicate with it, such as a bus bridge 542 and I/O devices 543. Via a bus 544, the bus bridge 542 may communicate with other devices such as a keyboard/mouse 545, communication devices 546 (such as modems, network interface devices, or other communication devices that may communicate with the computer network 305), audio I/O device, and/or a data storage device 548. The data storage device 548 may store code 549 that may be executed by the processors 502 and/or 504.

In various embodiments of the invention, the operations discussed herein, e.g., with reference to FIGS. 1-5, may be implemented as hardware (e.g., circuitry), software, firmware, microcode, or combinations thereof, which may be provided as a computer program product, e.g., including a machine-readable or computer-readable medium having stored thereon instructions (or software procedures) used to program a computer to perform a process discussed herein. Also, the term "logic", may include, by way of example, software, hardware, or combinations of software and hardware. The machine-readable medium may include a storage device such as those discussed with respect to FIGS. 1-5. Additionally, such computer-readable media may be downloaded as a computer program product, wherein the program may be transferred from a remote computer (e.g., a server) to a requesting computer (e.g., a client) by way of data signals embodied in a carrier wave or other propagation medium via a communication link (e.g., a bus, a modem, or a network connection). Accordingly, herein, a carrier wave shall be regarded as comprising a machine-readable medium.

Reference in the specification to "one embodiment" or "an embodiment" means that a particular feature, structure, or characteristic described in connection with the embodiment may be included in at least an implementation. The appearances of the phrase "in one embodiment" in various places in the specification may or may not be all referring to the same embodiment.

Also, in the description and claims, the terms "coupled" and "connected," along with their derivatives, may be used. In some embodiments of the invention, "connected" may be used to indicate that two or more elements are in direct physical or electrical contact with each other. "Coupled" may mean that two or more elements are in direct physical or electrical contact. However, "coupled" may also mean that two or more elements may not be in direct contact with each other, but may still cooperate or interact with each other.

Thus, although embodiments of the invention have been described in language specific to structural features and/or methodological acts, it is to be understood that claimed subject matter may not be limited to the specific features or acts described. Rather, the specific features and acts are disclosed as sample forms of implementing the claimed subject matter.

What is claimed is:

1. An apparatus comprising:
one or more storage units to store a first memory page size corresponding to a first device and a second memory page size corresponding to a second device; and
a first logic to convert a first address, corresponding to an access request from the first device to the second device, into a second address based on a difference between the first memory page size and the second memory page size, wherein the first logic is to convert the first address into the second address in response to a determination that the first memory page size has a different value than the second memory page size.

2. The apparatus of claim 1, further comprising a second logic to decode the first address to determine a virtual interface number and a base register offset value.

3. The apparatus of claim 2, wherein the first logic is to concatenate the virtual interface number and the base register offset value to generate the second address.

4. The apparatus of claim 2, wherein the first logic is to logically OR the virtual interface number and the base register offset value to generate the second address.

5. The apparatus of claim 2, wherein the first logic is to convert the first address into the second address based on the first memory page size and a number of virtual interfaces supported by the second device.

6. The apparatus of claim 1, further comprising one or more memories to store data corresponding to one or more of the first address or the second address.

7. The apparatus of claim 1, wherein one or more of the first logic, the one or more storage units, or one or more processor cores are on a same integrated circuit die.

8. The apparatus of claim 1, wherein one or more of the first logic, the first device, the second device, or the one or more storage units are on a same integrated circuit die.

9. A method comprising:
determining a first memory page size corresponding to a first device;
determining a second memory page size corresponding to a second device;
converting a first address, corresponding to an access request from the first device to the second device, into a second address based on a difference between the first memory page size and the second memory page size; and performing the converting after determining that the first memory page size and the second memory page size differ.

10. The method of claim 9, further comprising decoding the first address to determine a virtual interface number and a base register offset value.

11. The method of claim 10, further comprising concatenating the virtual interface number and the base register offset value to generate the second address.

12. The method of claim 10, further comprising logically OR-ing the virtual interface number and the base register offset value to generate the second address.

13. The method of claim 10, wherein converting the first address into the second address is performed based on the first memory page size and a number of virtual interfaces supported by the second device.

14. A system comprising:
at least one storage unit to store a first memory page size corresponding to an input/output (I/O) device and a second memory page size corresponding to a second device; and; and a chipset to receive an access request from the second device and directed to the I/O device to access a location within a memory of the I/O device identified by a first address, the chipset to generate the first address based on a second address corresponding to the access request and in response to a difference between the first memory page size and the second memory page size, wherein the first address is to be converted into the second address in response to a determination that the first memory page size has a different value than the second memory page size.

15. The system of claim 14, wherein the access request comprises one or more of a memory read request or a memory write request.

16. The system of claim 14, wherein the chipset comprise a virtualization logic to translate virtual addresses into physical addresses.

17. The system of claim 14, wherein the chipset is coupled to the I/O device via a peripheral component interconnect.

18. The system of claim 14, further comprising an audio device coupled to the chipset.

* * * * *

UNITED STATES PATENT AND TRADEMARK OFFICE
CERTIFICATE OF CORRECTION

PATENT NO. : 7,657,724 B1 Page 1 of 1
APPLICATION NO. : 11/638222
DATED : February 2, 2010
INVENTOR(S) : Eric DeHaemer It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 360 days.

Signed and Sealed this

Twenty-eighth Day of December, 2010

David J. Kappos
*Director of the United States Patent and Trademark Office*